Figure 1:
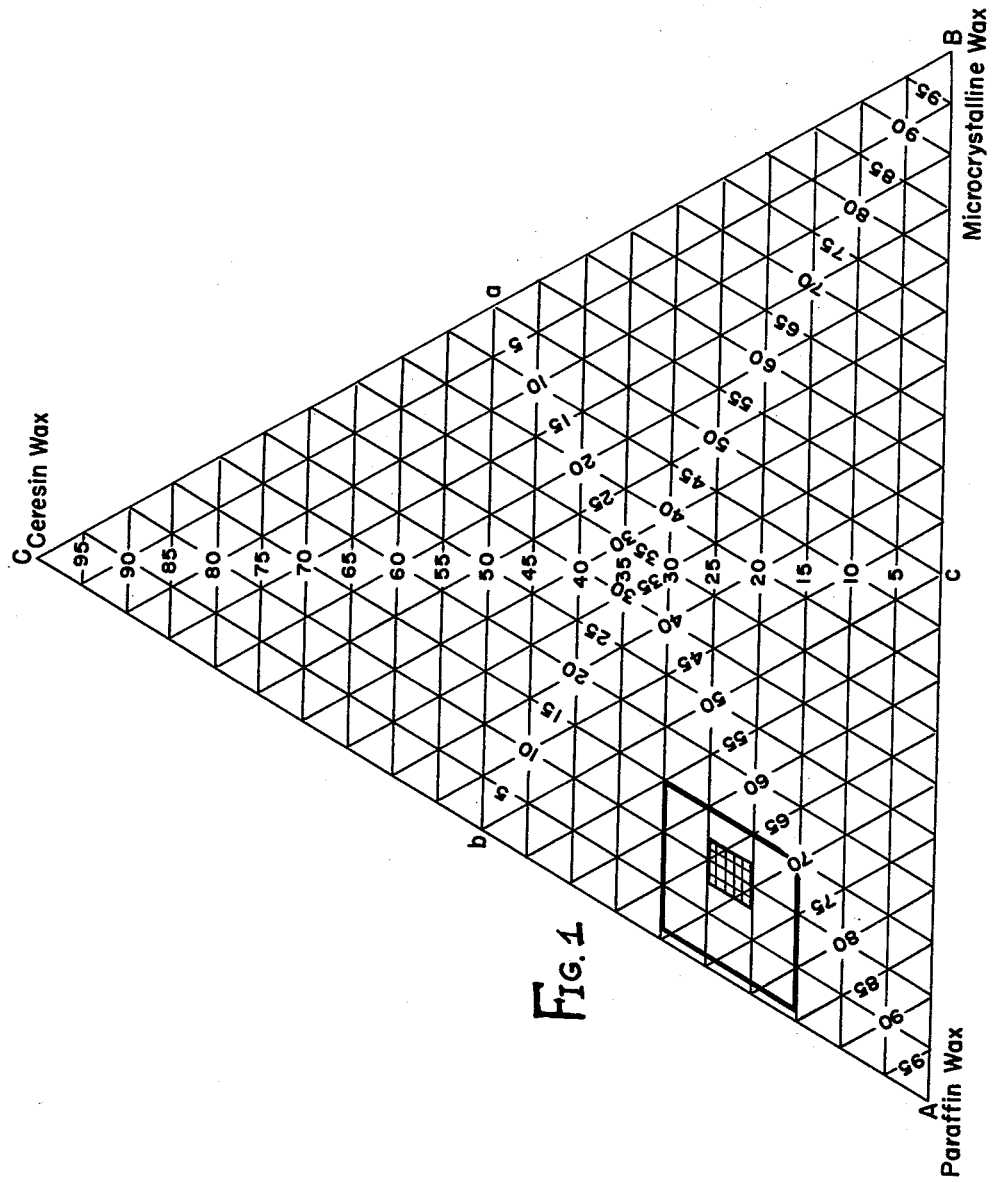

Oct. 23, 1962

N. L. MALAKOFF ETAL 3,060,045

DAIRY CONTAINER COATING FORMULATION

Filed Nov. 17, 1959

INVENTORS
Norman L. Malakoff
BY Lawrence B. Nelson

Charles A. Huggett

ATTORNEY

3,060,045
Patented Oct. 23, 1962

3,060,045
DAIRY CONTAINER COATING FORMULATION
Norman L. Malakoff, New York, and Lawrence B. Nelson, Garden City, N.Y., assignors to Socony Mobil Oil Company, Inc., a corporation of New York
Filed Nov. 17, 1959, Ser. No. 853,609
6 Claims. (Cl. 106—270)

The invention is directed to a wax formulation for coating containers and is particularly directed to a formulation for use in dip coating paperboard milk containers.

The importance of wax as a protective material has been growing steadily ever since man first discovered its value as a protective coating. The known uses of wax date back several thousand years to ancient times when the Egyptians employed it to protect their paintings, their mummies, and employed it in various ways in building their pyramids. Hubert W. Jenkins and Harold B. Friedman describe broadly the various types of vegetable, mineral and animal waxes in an article entitled "Modern Wax Technology" which appeared in the Journal of Chemical Education, pages 182–186, dated April 1949. Jenkins et al. divide the mineral waxes into paraffin waxes obtained from paraffin distillate and melting from 100–140° F. and microcrystalline wax obtained from the residual oil after the paraffin wax distillate has been removed. These microcrystalline waxes are obtained by precipitation from suitable solvents, usually after the residual oil has been deasphalted with sulfuric acid or solvents, and are much more plastic than the paraffin waxes, melting from about 140–200° F. The preparation of a high-melting point microcrystalline wax which is ductile and adhesive at low temperature without being sticky and tacky at normal temperature or above is disclosed in U.S. Patents 2,123,982 and 2,306,201. The wax is obtained from petrolatum by first steam distilling the petrolatum to a residue and then precipitating the wax from suitable solvents at 80° F. A wax with a melting point of 160° F. is produced. Sachanen reports in "The Chemical Constituents of Petroleum," dated 1945, at pages 286–299, that a petroleum ceresin wax may be obtained from the residual oil and that this wax differs from the microcrystalline wax in being more brittle and having a higher melting point. This petroleum ceresin wax is said to resemble the ceresin wax obtainable from mineral ozokerite.

Warth disclosed in "The Chemistry and Technology of Waxes," dated 1947, pages 246–249, that microcrystalline wax can be blended with paraffin wax in all proportions. The microcrystalline waxes appear to have more branching in the chain structure than the paraffin waxes, which accounts for their high degree of plasticity. The addition of microcrystalline wax to paraffin wax raises the melting point of the paraffin wax and hence it is used extensively where plasticity and high melting point are desirable. Warth points out that these microcrystalline waxes may be quite soft and adhesive but that they may also be quite hard and firm like beeswax. In a more recent edition of "The Chemistry and Technology of Waxes," dated 1956, Warth discloses that the "bottoms" or residues of the still are treated with sulfuric acid to remove asphaltic material and that the oil is chilled to a temperature near freezing, whereupon crude microcrystalline wax precipitates. This wax is dissolved in a suitable solvent and cooled to a temperature at which the high-melting crystalline fraction precipitates, usually 100 to 70° F. This petroleum ceresin wax is removed and the resulting solution is cooled to below 40° F. to precipitate an adhesive wax called petrolatum wax. This highly plastic wax derived from crude microcrystalline wax is useful as a laminating wax. The double deoiling of the crude microcrystalline wax is only carried out when either the hard, brittle, high-melting ceresin wax is desired or the lower-melting, plastic petrolatum wax is desired. Generally the crude microcrystalline wax is precipitated at about 40–60° F. to provide the commercial grades of microcrystalline waxes which have melting points of about 150–170° F. Solvents for effectively separating microcrystalline waxes are fully disclosed in Warth's text at pages 421, 422, being divided into polar and nonpolar solvents. The nonpolar solvents include chlorinated solvents diluted with benzene, toluene or naphtha while the polar solvents include acetone, methylethyl ketone (MEK) etc. Warth discloses various tank bottom waxes obtained from wax settlings accumulated in the storage of crude. These waxes are said to resemble the petroleum ceresin waxes obtained from petrolatum stock by selective solvent precipitation.

The use of wax as a coating material for paper and paperboard has been growing constantly in recent times. Wax was first used extensively as a moisture-proofing material for the inner wraps of biscuit packages starting at about 1900 (see TAPPI Bulletin No. 27, dated March 13, 1944). The wartime use of plastic additions to wax to provide improved coatings is disclosed in the cited reference. The use of addition agents in improving wax formulations for coating purposes is shown in U.S. Patent No. 2,127,668, which teaches that additions of microcrystalline wax to paraffin wax increase the tensile strength of the wax for use in paper coating and that oil additions to the wax decrease the tensile strength and hence oil is an undesirable constituent of a paper coating wax. U.S. Patent No. 2,031,036 discloses a paraffin wax mixed with 20% microcrystalline wax and a suspended colloid of natural and artificial resins, modified phenolformaldehyde resins and other condensation and polymerization products on the market. This composition is shown to be useful for coating paper, cardboard or other material.

U.S. Patent No. 2,157,625 discloses that a high-melting paraffin type or ceresin wax can be obtained from heavy lubricating oil distillates after acid treatment by precipitation from naphtha at about −25° F. The slack wax formed is dissolved in "oleum" spirits and chilled to about 70° F. to crystalline wax, which is further dissolved in "oleum" spirits and pressed at about 100° F. to produce a paraffin type wax having a melting point of 180–185° F. This patent discloses that the ceresin wax or high-melting paraffin type wax can be blended with ordinary paraffin wax having a melting point of about 130° F. to produce a hard wax. This patent distinguishes hard, brittle ceresin wax or high-melting paraffin wax having an index of refraction at 88° C. of about 1.436 from the tough, tacky petrolatum wax, viz. the ordinary microcrystalline wax of commerce.

The U.S. Patent No. 2,298,846 discloses the addition of plastic materials to wax to provide improved coating compositions for paper and sheet materials used to protect foodstuffs. The plastics are polyalkenes such as polyethylene, polybutylene, etc. The suggested waxes are crystalline paraffin, amorphous or microcrystalline, petrolatum and high melting point waxes like carnauba wax. The U.S. Patent No. 2,348,689 discloses a wax formulation for coating containers containing hot molten foods which congeal when cooled. The patent prescribes a needle penetration by ASTM Method D5–25 between 60 at 77° F. and 10 at 45° F. and states this can be obtained by blending microcrystalline waxes of various characteristics or by adding a metallic soap of the higher fatty acids to the microcrystalline wax to increase the viscosity of the wax.

U.S. Patent No. 2,399,521 discloses that the tensile strength of paraffin wax can be materially improved by the addition of small amounts of amorphous or microcrystalline wax provided the usual 6–10% residual oil has been removed from the microwax by powerful oil-solvent mixtures. U.S. Patent No. 2,443,221 discloses that a mixture of normal paraffin and microwax in the ratio 20–85% paraffin and 80–15% microcrystalline wax when coated on paperboard is resistant to grease, moisture and air penetration and vegetable and animal fats and oils. This patent states that further improvement can be obtained by adding minor amounts of resinous substances to the wax blend. The additive materials specified are natural rosin, modified rosins, such as polymerized rosins, hydrogenated rosins, terpene polymers, coumarone resins, naphthalene polymers, cycloparaffin polymers and phenolic resins.

U.S. Patent No. 2,443,840 discloses a method of obtaining a ceresin wax or high-melting hard wax from tank bottoms by solvent treatment of the crude oil tank bottoms without prior asphalt removal. The solvent solution is then cooled to about 80–90° F. to precipitate, i.e., a 190° F. M.P. wax having a penetration at 77° F. and 100 grams of 5 to 6 and an oil content of less than 1%. The presence of the asphalt materials is said to aid in the precipitation of this wax. The U.S. Patent No. 2,523,705 discloses a wax mixture of the carnauba type useful for coating paper, cloth and other fabrics prepared from paraffin wax and polyethylene. The mixture may contain between 19% polyethylene and 81% paraffin on the one hand, and 91% polyethylene and 9% paraffin on the other hand. U.S. Patent No. 2,551,087 discloses laminating cements to unite or laminate sheets of paper formed by mixing 0.1–20% polyethylene of at least 15,000 molecular weight with paraffin or microcrystalline wax and a variety of resins compatible with the mixture and a suitable plasticizer. The U.S. Patent No. 2,559,645 shows a blend for dip coating paper packages to produce a non-tacky coating formed by mixing a polyethylene of molecular weight between 6,000 and 140,000 with microcrystalline wax in molten state at a 1:1 ratio followed by a dilution of the blend with additional molten microcrystalline wax. A synthetic wax of the carnauba type is disclosed in U.S. Patent No. 2,560,773. Microcrystalline wax obtained from tank bottoms is mixed with polyethylene and blown with air at 400° F. to produce a hard, high-melting wax useful in polishing compounds.

The U.S. Patent No. 2,577,816 discloses that paraffin wax used for coating packages and wrappers must have less than 0.5% oil or the wax "blocks." This patent teaches that the tensile strength of paraffin wax can be increased by adding polyisobutylene and that by adding polyethylene as a third component blocking is prevented and an improved composition results. The patent discloses that without the polyisobutylene as a mutual solvent the polyethylene has relatively poor compatibility with the paraffin wax. The patent also discloses that chlorine in the wax in the form of chlorinated wax improves the solubility of polyethylene in the wax.

The U.S. Patent No. 2,582,037 discloses that wax paper for coating purposes must not block or stick together in the roll and yet the coating must be flexible. This patent shows that suitable wax blends can be obtained by using a major portion of mircocrystalline wax with small amounts of 3,000 to 15,000 molecular weight polyethylene and paraffin wax.

U.S. Patent No. 2,599,339 discloses adding an esterified aliphatic ester of an alkene-maleic anhydride copolymer to paraffin wax to improve the tensile strength of the wax. Unsaturated compounds useful in copolymerization with ethylene-1,2-dicarboxylic acid are ethylene, propylene, butylene, octylene and octadecene. U.S. Patent No. 2,599,130 discloses a coating wax for milk containers obtained by reacting wax, paraffin or microcrystalline, with urea and taking the unreacted wax as the coating wax.

U.S. Patent No. 2,638,459 states that the tensile strength of paraffin wax used for coating paper bottles is important because of the strain to which the bottle is subjected in handling. Blocking should be avoided as well as mottling, and a tendency toward scuffing found particularly in paraffin wax should be avoided. The patentees point out that the use of polyethylene has not been practical because the high molecular weight solid ethylene polymers dissolve with difficulty in molten paraffin wax even at 150° F.–160° F., normally used for waxing machine operations. The patentees state further that while solid ethylene polymers in melted condition are miscible with paraffins in all proportions, they tend to crystallize from solution at temperatures below about 230° F. The patent teaches that very small amounts of ethylene polymers having a molecular weight of 5,000–25,000, such as 0.001 to 7% of the total composition, can be added to paraffin or microcrystalline wax without difficulty and without impairing desirable qualities of the wax. Patent No. 2,628,203 teaches that polymers milled into wax are damaged and that this can be avoided by using polymers of a particle size not over ¼" in diameter in a wax above its melting point. The suggested polymers are natural rubber, copolymer of butadiene and styrene, copolymer of butadiene and acrylonitrile, polyisobutylene, polyethylene, etc.

The U.S. Patent No. 2,668,140 discloses a two-step deoiling process in which residual oil is separated at 40–60° F. and the wax put in solvent solution again and separated at 100° F. to provide a paraffin type or ceresin wax. A plastic wax is recovered from the residue of the second settling step. U.S. Patent No. 2,728,735 discloses a coating wax formed by mixing paraffin wax, ceresin or high-melting type paraffin wax, and a polymerized olefine having a molecular weight greater than about 1000, such as polyethylene of 1000–100,000.

U.S. Patent No. 2,703,292 discloses that soft waxes are lost in the sweating operation in the manufacture of paraffin wax and that these soft waxes are useful in the coating field, such as in the liquid proofing of milk cartons, since they exert a plasticizing effect and prevent the coating from cracking. This patent teaches blending scale wax having an oil content of about 1–4% with about 10% microcrystalline wax for use in coating milk containers. U.S. Patent No. 2,730,452 discloses that microcrystalline wax for use in laminating paper sheets can be improved with respect to brittle point and sealing strength by critical additions thereto of ceresin wax or paraffin-type high-melting wax.

U.S. Patent No. 2,733,225 relates to grease-resistant coatings essentially of paraffin wax modified by minor amounts of solid polyethylene polymer and microcrystalline wax. The coating is applied to cartons of butter, oleomargarine, bacon and lard. The microcrystalline wax should be hard with a needle penetration of about 2 to 7 and a melting point of approximately 190–195° F. This microcrystalline wax would appear to be misnamed, being more properly referred to as a ceresin wax. U.S. Patent No. 2,756,217 discloses an adhesive laminating wax formed by adding a copolymer of styrene and butadiene (intrinsic viscosity of about 0.08 to 0.30) to a hydrocarbon wax melting at about 122° F. to 180° F. A 7,000–25,000 molecular weight polyethylene may be added to the blend.

U.S. Patent No. 2,758,100 specifically relates to an improved dairy wax. A narrow boiling fraction is separated from a paraffin wax having less than 0.5% oil and about 0.1% to 10% of microcrystalline wax; polyethylene of molecular weight 4,000–22,000 or both is added.

U.S. Patent No. 2,773,045 points out that wax formulations must not block or stick together, should show low surface friction, i.e., low drag or high slip, and must not have too high a viscosity. If the viscosity is raised above that value at which it can be applied by the usual commercial coating equipment and methods at conventional rates of production, the increase in the cost of manufacture resulting would discourage the use of the composition. For example, a wax composition for making waxed paper and paperboard cartons by conventional wet waxing methods should not have a viscosity of more than 100 centistokes at 210° F. (ASTM D–445–46T method B) and preferably should have a viscosity of less than about 50 centistokes at 210° F. This patent discloses combinations of paraffin and microcrystalline wax with solid alcohol waxes to provide heat-sealable improvement. Blends of wax, polyethylene and polyethylene with a terminal hydroxyl group are disclosed.

The U.S. Patent No. 2,773,812 discloses wax formulations for coating dairy containers. The wax blend is specifically designed for use in coating containers designed to package cottage cheese. The blend comprises a mixture of normal paraffin wax, ceresin or high-melting type paraffin wax and about 2–10% lubricating oil. An improved wax formulation of superior heat-sealing properties is disclosed in U.S. Patent No. 2,817,640. The blend comprises a paraffin wax with a minor amount of a rubbery isobutylene polymer and a long chain alcohol wax. A wax formulation stabilized against darkening in color is disclosed in U.S. Patent No. 2,816,845. This comprises a paraffin wax, a microcrystalline wax and a small amount of dibenzalacetone.

A formulation for coating milk containers is disclosed in U.S. Patent No. 2,808,382. This formulation comprises 0.3–1.0% polyethylene, 10–25% microcrystalline wax, 56–83.7% paraffin, 5–15% technical eicosane and 1–3% petroleum oil. The technical eicosane is a low melting paraffin wax fraction. The eicosane and oil ratio in the wax blend is said to be critical.

U.S. Patent No. 2,803,612 discloses the advantage of low friction or good "slip" in a wax formulation. The patent teaches that good slip characteristics can be obtained in a paraffin wax-polyethylene blend by adding a small amount of 9-octadecenamide.

U.S. Patent No. 2,791,570 discloses wax formulations of improved sealing strength characteristics for paper coating. A selected low-boiling cut of slack wax is blended with a high-boiling cut of slack wax and a small amount of polyethylene to provide the improved formulation.

U.S. Patent No. 2,783,161 discloses that improved slip may be obtained in a paper coating wax by adding a small amount of nonaethylene glycol distearate. U.S. Patent No. 2,780,556 discloses a formulation having improved sealing strength, particularly at low temperature, comprising microcrystalline wax and a small amount of substantially saturated hydrocarbons containing a maximum of one double bond per molecule and about 3–4 fused hydrocarbon rings per molecule.

U.S. Patent No. 2,842,483 discloses a coating wax for paperboard cartons containing fruit juices. A paraffin wax is blended with a microcrystalline wax, said microwax containing its normal complement of ceresin wax (5–40% of the microwax), and said blend containing about 1–3% oil. U.S. Patent No. 2,846,375 discloses a three-component wax formulation useful as a low-temperature sealing wax and as a coating wax. Paraffin wax is blended with microcrystalline wax and a plastic wax defined as petrolatum wax. Residual oil is mixed with solvent and filtered at low temperature to provide a bright stock lubricating oil and petrolatum—a wax of high oil content. The petrolatum is generally mixed with solvent and precipitated at about 40° F. to produce microcrystalline wax. The plastic wax is obtained by blending the petrolatum stock with solvent and precipitating ceresin wax at 70–100° F. The filtrate is cooled to 40° F. to precipitate the desired plastic or petrolatum wax.

It is seen from this review of the prior art that while paraffin wax or paraffin wax-microcrystalline wax blends have been used extensively for coating paper, either as laminating or packaging papers for foods or for coating containers for transporting fruit juices, milk and other liquids, a considerable amount of dissatisfaction with the resultant coating is evidenced by the extensive art showing improved formulations. The variety of additive materials indicates a continuous dissatisfaction and unfortunately none of the improved formulations have been found entirely satisfactory. The improvement of one characteristic by an addition to the blend or modification of the blend causes an impairment of another characteristic of the blend.

There are three disadvantages to the use of wax-coated containers for milk, fruit juices and other liquid products. The coating has a slippery or greasy feel. This makes the container difficult to grasp and is unpleasant to the customer. The wax coating has a tendency to rub off on objects which the container may contact, such as the refrigerator shelves, clothing of a person carrying the container or table tops on which the container is placed. The wax coating also has a tendency to flake off in small pieces from the container walls and fillets into the container liquid. These particles are difficult to see in a material such as milk and are considered quite objectionable by the consumer. While efforts have been made to improve these qualities of petroleum wax used in dairy coating applications, no satisfactory solution has yet been found. For reasons of economy, the inside and outside of the container must be coated with the same wax. The outside coating on the container should be glossy and hard so as to resist rub-off. It is also desired that the exterior coating have a dry feel rather than a slippery or waxy feel. On the other hand, the interior coating should be flexible so as to resist shocks and not flake. Obviously, it is difficult to build all of these contradictory improvements into the same wax, and hence no satisfactory solution of this problem has yet been found. The hardness of the coating may be increased, but only at the cost of the flexibility, which will increase flaking. The flexibility may be increased but at the expense of hardness, which will increase the rub-off tendency of the coating. It has been found difficult to remove or even reduce the typical slippery waxy feel of the coating by making either of the changes indicated above.

We have found that these problems can be solved by blending ordinary paraffin wax with microcrystalline wax and adding a substantial amount of ceresin wax to the blend while keeping oil content at a minimum level. The ratio of ingredients is critical for dairy coating applications, a primary consideration being that the ceresin wax content of the microcrystalline wax must be increased substantially above normal levels. This requirement is surprising and could not have been predicted from the prior art.

The object of this invention is to provide an improved coating wax for application to paper and paperboard.

A further object of this invention is to provide an improved dairy coating wax formulation for application to milk cartons of paperboard.

A further object of this invention is to provide an improved coating wax for dip coating milk cartons which provides resistance to flaking, resistance to rub-off and yet has a dry, non-greasy feel providing improved handleability.

A further object of this invention is to provide an improved economical coating wax formulation using substantially only petroleum wax ingredients which, while being resistant to flaking, rub-off and possessing a dry, frictional feel, can be applied to dairy cardboard cartons in conventional dip coating operations.

These and other objects of the invention will be more fully disclosed in the following detailed description of the invention and the attached drawings.

FIGURE 1 is a ternary diagram showing formulations broadly effective in accordance with this invention and also those formulations preferred for use in accordance with this invention.

Waxed dairy cartons are coated by a dipping procedure in which the preformed carton is immersed in a bath of molten wax and then allowed to drain to remove the excess wax. The resultant wax coating, when solidified, forms a glossy, liquid-resistant film on the paper carton which may be used to store milk, orange juice and other liquids. These containers are either coated at a central location and shipped to individual dairies for filling or are formed, dipped and filled at the dairy. The formed carton is dipped into the wax bath at a temperature between 150–180° F. The proper selection of dipping temperature is important and is made with consideration of the melt characteristics of the wax. When the carton is withdrawn from the wax bath, it is allowed to drain to remove the excess wax. The draining period is critical in that if it is too short, an excessive amount of wax will be used, and if it is too long, too much wax will drain from the container walls and leave dry areas which are not protected with wax. Since the dipping and draining cycles are usually fixed, the temperature of the wax bath is regulated so that the wax has the proper viscosity and will deposit a coating of the proper thickness. One of the problems encountered in the past in choosing additives and components to add to the base dairy wax has been the viscosity of the resultant blend. If the resultant viscosity of the blend is too high, a suitable coating cannot be applied by a dipping procedure. Although present dairy wax formulations are applied between 150–180° F., it is possible for the wax baths of the dipping machines to be operated as high as 210° F. or more. However, at about 200–205° F., excessive amounts of the residual moisture from the paperboard are expelled, causing pinholes and bubbles to form in the coating. These bubbles result in a lack of protection in that particular area and the coating is unsuitable. Also, at these excessive temperatures, enough moisture is expelled from the paper during the dipping operation to cause it to become brittle. Thus, any blend prepared for dip coating dairy cartons must have a viscosity below a predetermined maximum level.

We have found that a wax blend suitable for dipping milk cartons on conventional dipping machines can be prepared by blending microcrystalline wax, ceresin wax and paraffin wax. The concentration of components must be within about the following ranges:

| | Broad Operating Limits, percent | Preferred Operating Limits, percent |
|---|---|---|
| Cresin Wax | 15-30 | 20-25 |
| Microcrystalline Wax | 1-15 | 8-12 |
| Paraffin Wax | 84-55 | 72-63 |

The concentration limits are defined in part by the performance requirements of the wax and the coating machines. Below the lower concentration limits the coating no longer possesses the dry frictional feel which distinguishes it from conventional dairy wax coatings. The scuff of wax coatings below the prescribed limits is higher and approaches that of conventional dairy wax. The upper concentration limits are determined in part by the viscosity requirement that the blend must not exceed 50 Saybolt Universal seconds at 210° F. in order to permit coating operations at a temperature below 200° F.

Conventional microcrystalline wax is obtained from heavy distillate oils or residual lubricating oils by well known solvent precipitation procedures. The wax is obtained from the solvent solution by cooling the liquid to a temperature range of about 40–60° F., producing a wax which melts at about 150–170° F. The conventional microcrystalline wax may be considered to be made up of two components, a ceresin wax component melting at high temperature and a plastic wax component melting at an intermediate temperature. The ceresin wax component is composed predominantly of normal and slightly branched paraffins. The lower melting plastic wax component is composed of highly branched and cyclic hydrocarbons. We have found that the ordinary microcrystalline waxes which are normally blended with paraffin wax in dairy wax formulations contain far too little ceresin wax to provide the desired dairy coating wax and hence ceresin wax must be extracted from petrolatum stock and blended heavily with microcrystalline wax to provide a critical amount of ceresin wax in the blend. Conventional microcrystalline wax is composed of about 20% ceresin wax and 80% plastic wax, although the exact composition will vary to some extent with the crude source and the method of processing. By placing a petrolatum stock in solvent solution and cooling to about 95–105° F. the ceresin component precipitates, leaving the lower melting plastic wax in solution. The ceresin wax is then blended with conventional microcrystalline wax and ordinary paraffin wax (melting at about 110–150° F. AMP) in the ratio indicated hereinabove to provide the improved coating composition.

We have found that oil is detrimental to the scuff qualities and feel of a coating wax and hence, prefer to keep the oil content of the components as low as possible. The oil content of the final blend should be below about 1% and preferably below about 0.75%.

EXAMPLES ILLUSTRATING THE INVENTION

The following blends were prepared by melting together the indicated components:

*Blend A*

65% of 125/127 AMP paraffin wax.
15% of 168° F. melting point microcrystalline wax, said wax having an oil content of 3.2% and the following penetration results:
   Penetration @ 77° F., 28.5.
   Penetration @ 108° F., 81.5.
   Penetration @ 115° F., 146.0.
20% high-melting ceresin wax.

*Blend B*

60%—125/127 AMP paraffin wax.
10% microcrystalline wax as defined in Blend A.
30% high-melting ceresin wax.

Table I shows the comparison of these blends with a standard paraffin dairy coating wax and a standard dairy coating wax blend of paraffin and microcrystalline wax.

TABLE I

| | Blend A | Blend B | 125/127 par. | 125/127 par. + 15% micro. |
|---|---|---|---|---|
| Tensile Strength, T.O., p.s.i. | 284 | 300 | 280 | 256 |
| Melting Pt., ° F | 164 | 179 | 127 | 132 |
| Penetration @ 77° F | 16 | 13.5 | 27 | 23 |
| Viscosity @ 210° F., SUS | 45 | 49 | 39 | 43 |
| Scuff, mg | 9 | 7 | 16 | 15 |

The tensile strength test, TO, is the standard ASTM D-1320–57T test. The oil content is determined by the ASTM D-725–56T test. The melting point is determined by the ASTM D-127–49 test. The needle penetration is determined by the ASTM D-1321–57 test. Viscosity is determined by the ASTM D-445–53T test.

The Table I shows the excellent tensile strength characteristics of this wax and illustrates markedly the improvement in scuff resistance and rub-off compared to standard dairy coating waxes. The scuff results reported were obtained by the following test procedure:

Scuff measurements were made on panels cut from the sides of wax-coated milk containers. The data refers to the amount of wax (in milligrams) that rubs off the test panels onto a uniform strip of cloth when a fixed length of the cloth is drawn between two panels. The panels (1½ x 2") are compressed by a 2¼-kg. weight while 5⅛" of the cloth (1½" wide) are drawn between them.

The test is performed at 72° F., 50% R.H. The data refers to the gain in weight of the cloth strip.

Conventional paraffin dairy waxes are soft at high temperature and brittle at low temperature. The addition of microcrystalline wax to paraffin wax decreases the brittleness at low temperature. The addition of ceresin wax to microcrystalline and paraffin wax in the ratio we prescribe markedly improves the hardness of the blend and decreases low temperature brittleness. Our blends have good flexibility and resistance to flaking. These blends also resist abrasion and rub-off much better than conventional wax blends and have a dry, frictional feel which is much more acceptable to the user than the ordinary slippery wax feel. Table I shows that our blends are within viscosity limits for dip coating and yet they have a fairly high melting point. The high melting point is particularly advantageous in dipping operations because the wax solidifies much more rapidly than conventional dairy waxes and so rub-off on the baskets and guide rails of the coating machine is greatly reduced. This is important because build-up of wax on the coating machine during wax application prevents normal operation and necessitates frequent costly interruptions to clean the machine.

A FIGURE 1 has been provided to show graphically the broad range of ingredients and the preferred range in which outstanding results are obtained. The preferred concentration area on the graph is not found in the center of the broad concentration area because the preferred amounts of microcrystalline wax required naturally contain some of the ceresin component (about 20%), therefore, requiring less of this component to be added to bring the three-component blend to the desired composition balance. The properties of several commercially available ceresin waxes are enumerated in Table II as follows:

TABLE II

| Ceresin Wax | ASTM, MP, °F. | Penetration, 100 gm./5 sec. | | Viscosity @ 210° F., SUS |
|---|---|---|---|---|
| | | @ 77° F. | @ 115° F. | |
| C | 188 | 5.5 | 15 | |
| D | 201 | 7.0 | 16.5 | 65 |
| E | 199 | 6.0 | 14 | 63 |
| F | 196 | 6.5 | 18.5 | 63 |
| G | 185 | 7.5 | 19 | 74 |
| H | 186 | 9.0 | 19.0 | 74 |

All of the waxes enumerated in Table II were found satisfactory. A ceresin wax obtained by deoiling a petrolatum from which commercial microcrystalline wax is obtained at a deoiling temperature of 95 to 105° F. instead of the customary 40–60° F. deoiling temperature used to produce microcrystalline wax was also found satisfactory. Table III shows the properties of the ceresin wax obtained from petrolatum.

TABLE III

| Deoiling Temp. | Penetration @ 100 gm./5 sec. | | ASTM, MP, °F. | Viscosity @ 210° F. SUS |
|---|---|---|---|---|
| | @ 77° F. | @ 115° F. | | |
| 105 | 6 | 16 | 193.5 | 95 |
| 100 | 6.5 | 14.5 | 191 | 95 |
| 95 | 6.5 | 15.5 | 187.5 | 93 |

Example 1

The wax blend described above as Blend A was given a full-scale test in a commercial dairy carton dipping machine and the results were outstanding. The bath temperature was maintained at 180° F., no other modifications being required. Regular half-gallon milk cartons were dipped by the machine and the improved results were readily apparent.

Example 2

The wax blend described above as Blend B was given a full-scale test in a commercial dairy carton dipping machine and the results were outstanding. The bath temperature was maintained at 190° F., no other modifications being required. Regular half-gallon milk cartons were dipped by the machine and the improved results were readily apparent.

Example 3

In order to obtain an independent evaluation of the unusual frictional feel obtained by these wax coatings coefficient of friction measurements were made by an independent laboratory. These measurements were made using a Dura slip resistance tester, which is a standard testing apparatus for measuring static coefficients of friction. Friction data were obtained for the four waxes reported in Table I and for a wax blend containing 10% of an 8,000 molecular weight solid polyethylene. Data was obtained using both glass and leather as reference surfaces. These data are shown in Table IV.

TABLE IV

| | Blend A | Blend B | 125/127 par. | 125/127 par. 15% micro. | 125/127 par. 10% poly. |
|---|---|---|---|---|---|
| Scuff (mg.) | 9 | 7 | 16 | 15 | 13 |
| Coefficient Friction: | | | | | |
| vs. Glass | 0.33 | 0.41 | 0.19 | 0.23 | 0.21 |
| vs. Leather | 0.87 | 0.99 | 0.50 | 0.79 | 0.70 |
| Feel | Dry | Dry | (1) | (1) | (1) |

[1] Typical waxy.

The scuff and feel measurements reported in Table IV were made at 70° F. This table shows that the outstanding results of our new wax formulations are readily apparent by independent testing methods. The waxes which have the highest coefficient of friction have the lowest scuff and feel the dryest.

The oil content of Blends A and B in Table I are between 0.65 and 1.0 percent (ASTM D–725–56T). It has been mentioned above that oil is detrimental to the scuff qualities and feel of the wax coatings of our formulation, and that we prefer to keep the oil content of the final blend below about 1% and preferably below about 0.75%. To demonstrate this we have added about 2% of a light mineral oil to Blend A and 3% of the same oil to Blend B to bring their oil contents to about 2.5 to 3 percent. Coatings of these blends containing the added oil had a typical waxy or oily feel (see Table IV) unlike the dry feel of the original wax blends. The scuff of these coatings was raised to 13 and 12, respectively, by the addition of oil. However, low oil content alone is not the explanation for low scuff and dry feel. The 125/127 AMP paraffin in Table I has an oil content of about 0.2%, yet has a typical waxy feel and a scuff of 16.

It is understood that minor ingredients may be added to the wax blend in amounts sufficient to perform a particular function without impairing the effectiveness of the blend. For instance, well known oxidation-retarding materials, such as butylated hydroxy toluene, may be added in fractional amount such as .0005%. Since the wax is maintained at elevated temperature for long periods of time, oxidation of various wax components may occur, and hence an improved wax formulation is obtained by adding an oxidation-retarding agent such as butylated hydroxy toluene to the blend.

The illustrations of the invention given hereinabove are merely for the purpose of demonstrating the invention. The only limitations intended are found in the attached claims.

We claim:

1. A wax composition for coating milk containers and similar articles consisting essentially of: about 84–55% by weight of paraffin wax having a melting point about 120–150° F., about 1–15% by weight of microcrystalline wax having a melting point about 150–180° F., and about 15–30% by weight of petroleum ceresin wax having a melting point about 180–200° F.

2. A wax composition for coating milk containers and similar articles consisting essentially of: about 72–63% by weight of paraffin having a melting point about 120–150° F., about 8–12% by weight of microcrystalline wax having a melting point about 150–180° F., about 20–25% by weight of petroleum ceresin wax having a melting point about 180–200° F., the waxes being selected to provide a final blend with an oil content less than 1% by weight of the final blend.

3. A wax composition for coating milk containers and similar articles consisting essentially of: about 70% by weight of paraffin having a melting point about 125–130° F., about 10% by weight of microcrystalline wax having a melting point about 165–170° F., about 20% by weight of petroleum ceresin wax having a melting point about 185–200° F., the waxes being selected to provide a final blend with an oil content less than 1% by weight of the final blend.

4. The wax composition of claim 2 further characterized in that the oil content of the final blend is less than 0.75%.

5. The wax composition of claim 1 further characterized in that the composition has a viscosity at 210° F. less than 50 centistokes.

6. The wax composition of claim 2 further characterized in that the composition has a viscosity at 210° F. less than 50 centistokes.

References Cited in the file of this patent

UNITED STATES PATENTS

| | | |
|---|---|---|
| 2,733,725 | Smith | Jan. 31, 1956 |
| 2,773,812 | Tench | Dec. 11, 1956 |
| 2,842,483 | Pethrick | July 8, 1958 |
| 2,846,375 | Annable et al. | Aug. 5, 1958 |
| 2,885,340 | Tench | May 5, 1959 |
| 2,943,991 | Tench et al. | July 5, 1960 |
| 2,967,817 | Marple et al. | Jan. 10, 1961 |